US009490726B2

(12) United States Patent
Tanaka et al.

(10) Patent No.: US 9,490,726 B2
(45) Date of Patent: Nov. 8, 2016

(54) CONTACTLESS POWER SUPPLY DEVICE

(75) Inventors: Kazufumi Tanaka, Chiyoda-ku (JP); Sadayuki Matsumoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 338 days.

(21) Appl. No.: 14/343,009

(22) PCT Filed: Sep. 5, 2012

(86) PCT No.: PCT/JP2012/005605
§ 371 (c)(1),
(2), (4) Date: Mar. 5, 2014

(87) PCT Pub. No.: WO2013/038617
PCT Pub. Date: Mar. 21, 2013

(65) Prior Publication Data
US 2014/0198544 A1 Jul. 17, 2014

(30) Foreign Application Priority Data
Sep. 15, 2011 (JP) ................. 2011-201877

(51) Int. Cl.
*H02M 7/5387* (2007.01)
*H02H 7/122* (2006.01)
(Continued)

(52) U.S. Cl.
CPC ......... *H02M 7/53871* (2013.01); *H01F 38/14* (2013.01); *H02H 7/1225* (2013.01);
(Continued)

(58) Field of Classification Search
CPC ......... H02M 7/53871; H02M 7/1225; H02M 7/53873; H02M 3/33538; H02M 3/337; H02M 2007/4815; H02J 5/005; Y02B 70/1441; H02H 7/1225
See application file for complete search history.

(56) References Cited

U.S. PATENT DOCUMENTS

| 6,515,878 B1 * | 2/2003 | Meins ..................... B60L 5/005 191/10 |
| 8,674,551 B2 * | 3/2014 | Low ............................. 307/104 |
| 2012/0098348 A1 * | 4/2012 | Inoue ..................... B60L 11/123 307/104 |

FOREIGN PATENT DOCUMENTS

| JP | 3546279 | 4/2004 |
| JP | 2010 088163 | 4/2010 |

(Continued)

OTHER PUBLICATIONS

Combined Office Action and Search Report issued Aug. 5, 2015 in Chinese Patent Application No. 201280044192.5 (with English translation).
(Continued)

*Primary Examiner* — Jue Zhang
(74) *Attorney, Agent, or Firm* — Oblon, McClelland, Maier & Neustadt, L.L.P.

(57) ABSTRACT

In order to obtain a contactless power supply device which, even when a spatial gap between a primary winding and a secondary winding varies, is capable of not only accurately detecting whether or not the primary winding and the secondary winding come into the position opposite to each other, but also detecting how large the spatial gap between the primary winding and the secondary winding is created, the contactless power supply device is provided with a drive voltage detection unit which detects the drive voltage of an inverter circuit, a drive current detection unit which detects the drive current of the inverter circuit, and a primary component extraction unit which, from the drive voltage and the drive current, extracts a primary drive voltage and a primary drive current including the first order frequency-components having the same frequency as a drive frequency of the inverter circuit.

9 Claims, 4 Drawing Sheets

(51) Int. Cl.
*H02M 3/335* (2006.01)
*H02M 3/337* (2006.01)
*H01F 38/14* (2006.01)
*H02J 5/00* (2016.01)
*H02M 7/48* (2007.01)

(52) U.S. Cl.
CPC .............. *H02J 5/005* (2013.01); *H02M 3/337* (2013.01); *H02M 3/33538* (2013.01); *H02M 7/53873* (2013.01); *H02M 2007/4815* (2013.01); *Y02B 70/1441* (2013.01)

(56) References Cited

FOREIGN PATENT DOCUMENTS

| | | | |
|---|---|---|---|
| JP | 2010 172084 | 8/2010 | |
| JP | WO 2010119577 A1 * | 10/2010 | ............ B60L 11/123 |
| JP | 2010 252446 | 11/2010 | |

OTHER PUBLICATIONS

International Search Report Issued Nov. 27, 2012, in PCT/JP12/005605 Filed Sep. 5, 2012.

* cited by examiner

US 9,490,726 B2

CONTACTLESS POWER SUPPLY DEVICE

TECHNICAL FIELD

The invention relates to an electromagnetic induction type contactless power supply device.

DESCRIPTION OF THE RELATED ART

In conventional contactless power supply devices, a large number of means have been proposed for disabling high-frequency power supply to the primary winding when the primary winding and the secondary winding do not come into the position opposite to each other. For example, whether or not the primary winding and the secondary winding come into the position opposite to each other can be detected on the basis of a phase difference between the voltage and the current of the primary winding (for example, refer to Patent Document 1).

PRIOR ART DOCUMENT

Patent Document

Patent Document 1: Japanese Patent Publication No. 3546279 (refer to pages 4 to 5, FIG. 2, and FIG. 3)

SUMMARY OF THE INVENTION

Problems to be Solved by the Invention

In the conventional contactless power supply device such as described in Patent Document 1, being influenced by the change in the load or the spatial gap between the primary winding and the secondary winding, the phase difference between the voltage and the current of the primary winding changes. Because of this, there has been a problem that might cause false detection as to whether the primary winding and the secondary winding come into the position opposite to each other. Furthermore, there exists a problem that a situation, where the spatial gap between the primary winding and the secondary winding is large, might lead to low conversion efficiency in performing power transmission and power reception.

The present invention is made to solve the above described problems, and to realize a contactless power supply device for not only detecting correctly whether the primary winding and the secondary winding come into the position opposite to each other, but also detecting how large the spatial gap is created between the primary winding and the secondary winding, even in a situation where the load or the spatial gap between the primary winding and the secondary winding varies.

Means for Solving the Problems

A contactless power supply device according to the invention includes an inverter circuit which outputs high-frequency power; a control circuit which controls the inverter circuit; a primary winding which is supplied with the high-frequency power from the inverter circuit, to transmit power through electromagnetic induction by resonating with a first capacitor; a drive voltage detection unit which detects a drive voltage of the inverter circuit; a drive current detection unit which detects a drive current of the inverter circuit; and a primary component extraction unit which extracts, from the drive voltage and the drive current, a primary drive voltage and a primary drive current including the first order frequency-components having the same frequency as a drive frequency of the inverter circuit, wherein the primary winding transmits power to a secondary winding which comes into a position opposite to the primary winding through a spatial gap, and the control circuit calculates, on the basis of the primary drive voltage and the primary drive current, the magnitude and the phase of impedance of an inverter load.

Effect of the Invention

A contactless power supply device according to the present invention includes a drive voltage detection unit which detects the drive voltage of the inverter circuit, a drive current detection unit which detects the drive current of the inverter circuit, and a primary component extraction unit that extracts the first order frequency-components of the drive voltage and the drive current, which have the same frequency as the drive frequency of the inverter circuit, from the drive voltage and drive current. Therefore, it is possible to detect whether or not the primary winding and the secondary winding come into the position opposite to each other, and further to detect how large the spatial gap is created between the primary winding and the secondary winding.

EMBODIMENT FOR CARRYING OUT THE INVENTION

Embodiment 1

Figure 1:
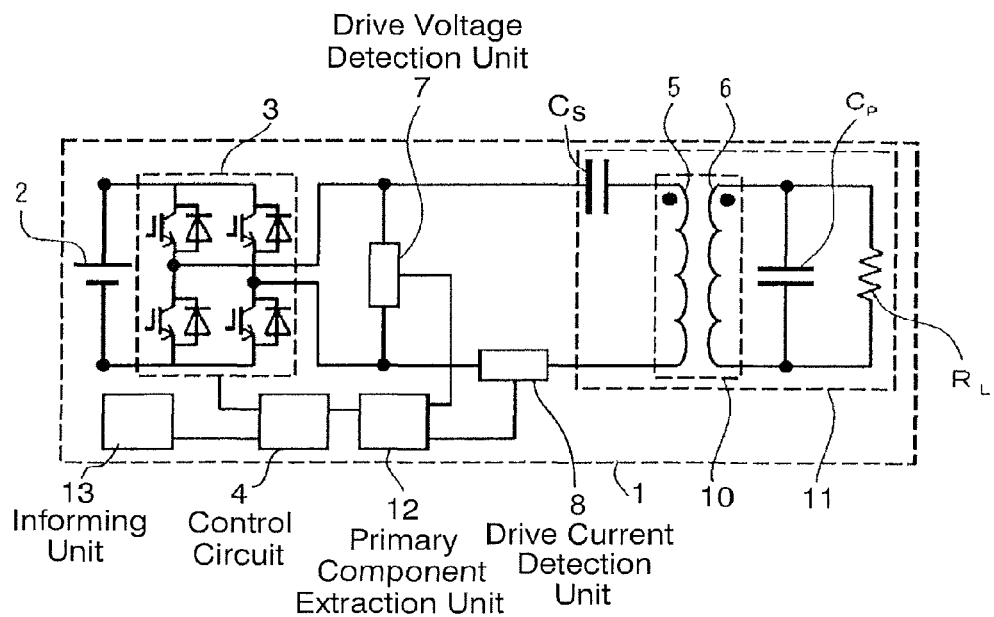
FIG. 1 is a circuit block diagram showing an electrical configuration of a contactless power supply device according to Embodiment 1 of the invention.

FIG. 1 is a circuit block diagram schematically showing an electrical configuration of a contactless power supply device according to Embodiment 1 for carrying out the invention. In FIG. 1, a contactless power supply device 1 includes: a direct current power supply 2; an inverter circuit 3 which outputs high-frequency power; a control circuit 4 which controls the inverter circuit 3; a primary winding 5 which is supplied with the high-frequency power from the converter 3, to transmits power through electromagnetic induction by resonating with a serial capacitor $C_S$ being a first capacitor; a secondary winding 6 which receives power through a spatial gap between itself and the primary winding 5 through electromagnetic induction in relation to the primary winding 5 by resonating with a parallel capacitor $C_P$ being a secondary capacitor; a load $R_L$ which consumes power transmitted and received between the primary winding 5 and the secondary winding 6; a drive voltage detection unit 7 for detecting a drive voltage of the inverter circuit 3; and a drive current detection unit 8 for detecting a drive current of the inverter circuit 3.

However, the serial connection or the parallel connection of the capacitor shown in FIG. 1 is an example, and not limited to this. For example, instead of the serial capacitor $C_S$, a capacitor may be inserted parallel to the primary winding 5. In any case, the fundamental feature of a contactless power supply device to which the invention is applied, is in that highly-efficient power transmission can be performed by forming respective LC resonance circuits in the primary side and the secondary side even when the spatial gap between the primary winding and the secondary winding is wide.

Although the primary winding 5 and the secondary winding 6 in FIG. 1 are wounded in directions so as to have the same polarity, the winding direction may be opposite each other for the opposite polarity. Note that, in Embodiment 1, the secondary winding 6, the parallel capacitor $C_P$, and the load $R_L$ of the contactless power supply device 1 are installed in a mobile unit side, and the rest thereof are installed in a stationary side. In a case where a contactless power supply device according to the invention is applied to an elevator, the mobile unit side corresponds to an elevator car, and the stationary side corresponds to a ground facility.

The direct current power supply 2 may be a power supply that converts AC power from a two-phase or a three-phase AC power supply (not shown) into DC power by means of a rectifier circuit (not shown) and a filter circuit (not shown). An arbitrary circuit configuration can be employed for the inverter circuit 3. For example, it can be constituted with a half-bridge circuit or a full-bridge circuit.

In addition, the primary winding 5 and the secondary winding 6 each may be wound around an iron core 9 made of ferrite, etc. When the high-frequency power is supplied to the primary winding 5, an alternating magnetic field is formed in its surrounding area, and the alternating magnetic field crosses the secondary winding 6, and then an induced electromotive force is generated in the secondary winding by electromagnetic induction phenomenon. Thus contactless power transmission and power reception are performed between the primary winding 5 and the secondary winding 6.

The contactless power supply device 1 includes a contactless power supply part 10 that is constituted with the primary winding 5 and the secondary winding 6 magnetically coupled to each other. Because of this, the drive voltage and the drive current of the inverter circuit 3 depend upon an inverter load 11 constituted with the serial capacitor $C_S$, the primary winding 5, the parallel capacitor $C_P$, the secondary winding 6, and the load $R_L$. Note that the inverter load means a circuit configuration to which the inverter circuit 3 supplies electric power, and is not limited to the configuration shown in FIG. 1. For example, in a case of configuring a rectifier circuit that is made up of a rectifier, a smoothing reactor, and a smoothing capacitor, and connected between the secondary winding 6 and the load $R_L$ shown in FIG. 1, the circuit configuration including the rectifier circuit corresponds to the inverter load. In a case of further connecting a DC/DC converter between the rectifier circuit and the load $R_L$, the circuit configuration including the rectifier and the DC/DC converter corresponds to the inverter load.

A drive voltage detection unit 7 detects a drive voltage V applied across both ends of the serial circuit configured with the serial capacitor $C_S$ and the primary winding 5. An arbitrary circuit configuration such as a resistance voltage divider, which would be easily conceived by those skilled in the art, can be adopted as the drive voltage detection unit. The drive current detection unit 8 detects a drive current I flowing through the serial capacitor $C_S$ and the primary winding. Similarly, an arbitrary circuit configuration can be adopted as the drive current detection unit. As the drive current detection unit 8 according to the invention, for example, a current transformer is adopted.

Furthermore, the contactless power supply device 1 according to the invention includes a primary component extraction unit 12 that is electrically connected to the drive voltage detection unit 7 and the drive current detection unit 8. When the inverter circuit 3 is driven by a control signal having a predetermined drive frequency (for example, 10 kHz), the drive voltage detection unit 7 and the drive current detection unit 8 detect the high-frequency modulated drive voltage V and the high-frequency modulated drive current I. The primary component extraction unit 12 extracts a primary drive voltage $V_1$ and a primary drive current $I_1$, which include the first order frequency-components having the same frequency as the drive frequency of the inverter circuit 3, from the drive voltage and the drive current detected by the drive voltage detection unit 7 and the drive current detection unit 8.

Figure 2:
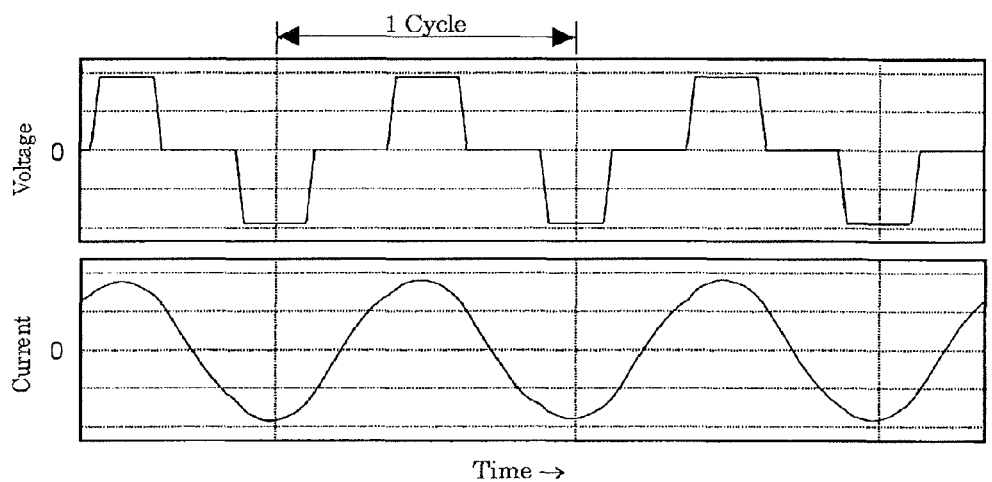
FIG. 2 illustrates waveforms of a drive voltage and a drive current detected by a drive voltage detection unit and a drive current detection unit, respectively, according to Embodiment 1 of the invention.

FIG. 2 shows an example of a waveform chart of the drive voltage and the drive current detected by the drive voltage detection unit and the drive current detection unit according to Embodiment 1. In FIG. 2, the horizontal axis represents time, and the respective vertical axes represent the voltage and the current. The primary component extraction unit 12 can extract only primary components of the drive voltage V and the drive current I (that is, components having the same frequency as the drive frequency) from the drive voltage V and the drive current I shown in FIG. 2 detected by the drive voltage detection unit 7 and drive current detection unit 8, using discrete Fourier transform with a sampling frequency of, for example, an integer multiple of the drive frequency. In the case of FIG. 2, the primary component extraction unit 12 extracts the primary drive voltage $V_1$ and the primary drive current $I_1$ based on the drive voltage V and the drive current I as shown in FIG. 2 in a time interval corresponding to one cycle of the drive frequency of the inverter circuit 3 (for example, one cycle is 100 μsec when the drive frequency is 10 kHz).

Note that, in the primary component extraction unit 12, an arbitrary method and an arbitrary algorithm can be adopted to extract a primary component from a signal having a plurality of high-frequency components. For example, using generally available software, a set of the primary components of the drive voltage V and the drive current I can be extracted alone. Alternatively a low-pass filter may be used to pass the primary components and attenuate the high-frequency components. However, when a low-pass filter is used in order to utilize information on the magnitudes and the phases of the primary components as described later, the filter need to have a characteristic of not changing the phases of the primary components, or the filter having the same characteristic for the drive voltage signal and the drive current signal, needs to be adopted so that the phase difference between the voltage and the current is not changed.

When a Fourier transform is used in the primary component extraction unit 12 according to the invention, the respective primary components of the drive voltage V and the drive current I are expressed by the equation (1) and the equation (2) using complex notation.

$$V_1 = V_{1Re} + j \times V_{1Im} \quad (1)$$

$$I_1 = I_{1Re} + j \times I_{1Im} \quad (2)$$

Here, $V_1$ represents the primary drive voltage being the primary component of the drive voltage V, and $I_1$ represents the primary drive current being the primary component of the drive current I. $V_{1RE}$ and $I_{1RE}$ are the real parts of $V_1$ and $I_1$, $V_{1Im}$ and $I_{1Im}$ are the imaginary parts thereof, and "j" represents the imaginary unit.

Further, the impedance Z of the inverter load 11, the magnitude $|Z|$ of the impedance, and the phase $\theta$ of the impedance (the phase difference between the primary drive voltage $V_1$ and the primary drive current $I_1$) are expressed by the equations (3) to (5).

$$Z + V_1/I_1 \quad (3)$$

$$|Z| = \sqrt{(Re(Z)^2 + Im(Z)^2} \quad (4)$$

$$\theta = \arctan(Im(Z)/Re(Z)) \quad (5)$$

Here, $Re(Z)$ and $Im(Z)$ are the real part and the imaginary part of the impedance Z, respectively. In addition, the phase difference $\theta$ between the primary drive voltage $V_1$ and the primary drive current $I_1$ can also be expressed using "arcsin" or "arccos" instead of "arctan". Since "arctan" diverges and may contain more errors when the phase $\theta$ is in the vicinity of 90 degrees, the expression using "arcsin" or "arccos" may be more appropriate in some cases.

The control circuit 4 derives the magnitude $|Z|$ and the phase $\theta$ of the inverter load 11 from the primary drive voltage $V_1$ and the primary current $I_1$ being the primary components expressed in complex notation, and being extracted by the primary component extraction unit 12, to supply an appropriate drive signal based on these derived values to the inverter circuit 3. In addition, while the magnitude $|Z|$ and the phase $\theta$ of impedance can be derived using the equations (3) to (5), they may be obtained from the amplitudes of the drive voltage wave form and the drive current wave form, and a time difference between zero crossings thereof. Specifically, the control circuit 4, as will be described in detail hereafter, by deriving the magnitude $|Z|$ and the phase $\theta$ of impedance of the inverter load 11, detects the load or whether or not the primary winding 5 and the secondary winding 6 come into the position opposite to each other, or detects the spatial gap between the primary winding 5 and the secondary winding 6, based on the derived magnitude $|Z|$ and phase $\theta$ of impedance of the inverter load 11. Then, on the basis of the detection result, the control circuit 4 determines whether or not the high-frequency power can be supplied through electromagnetic induction.

Moreover, the control circuit 4 can also detect a short-circuit fault based on the derived magnitude $|Z|$ and phase $\theta$ of impedance of the inverter load 11. When a short-circuit fault is detected, the control circuit informs a user of an occurrence of the short-circuit fault using an informing unit 13. In addition, by detecting the voltage wave from of the modulated drive voltage V and the current wave form of the modulated drive current I in one cycle shown in FIG. 2, the control circuit 4 according to the invention derives the magnitude $|Z|$ and phase $\theta$ of impedance of the inverter load 11 based on these voltage and current wave forms, and immediately determines whether or not to supply the high-frequency power and whether or not a short-circuit fault occurs.

Note that, as described above, in a contactless power supply device having respective resonance circuits in the primary winding 5 and the secondary winding 6, since the parameters in these two resonance circuits simultaneously change when the spatial gap between the primary winding 5 and the secondary winding 6 changes, the impedance and the phase observed from the primary side change intricately. In the present invention, it is discovered that the spatial gap and a short-circuit fault at the secondary side can be detected with a relatively simple technique of plotting the magnitude $|Z|$ and the phase $\theta$ of the impedance on a two dimensional coordinate (two dimensional space).

Figure 3:
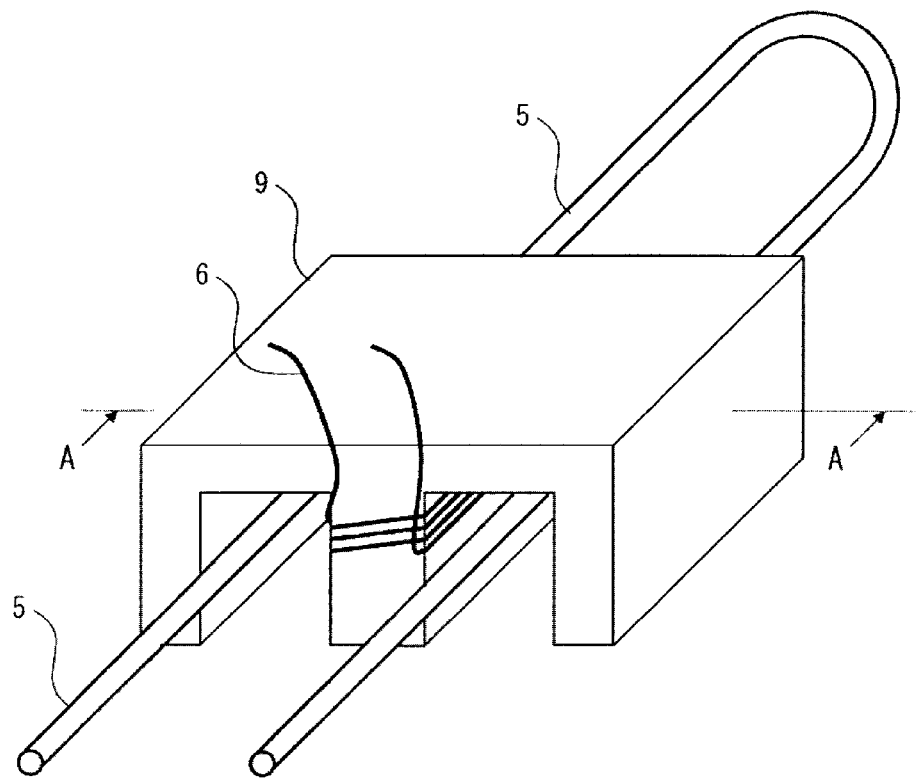
FIG. 3 is a perspective view of a contactless power supply part according to Embodiment 1 of the invention.
Figure 4:
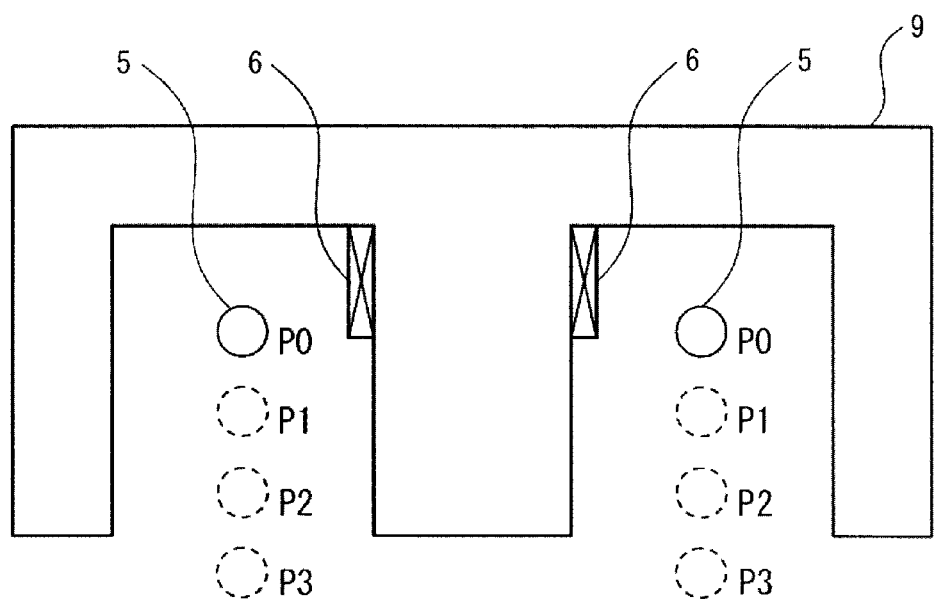
FIG. 4 is a cross-sectional view taking along the A-A line in FIG. 3.

Hereinafter, it will be explained using a specific example, how to determine whether or not to supply the high-frequency power and whether or not a short-circuit fault occurs, on the basis of the derivation of the magnitude $|Z|$ and the phase $\theta$ of impedance of the inverter load 11. FIG. 3 is a perspective view of the contactless power supply part according to Embodiment 1 for carrying out the invention, and FIG. 4 is a cross-sectional view taking along the A-A line in FIG. 3. The contactless power supply part 10 is constituted by the primary winding 5, the secondary winding 6, and the iron core 9 made of ferrite. The iron core 9 has an E-shape like cross-section, and the secondary winding 6 is wound around a central protruding portion of the E-shaped iron core 9. Further, the primary winding 5 is located so that it goes around the central protruding portion of the E-shaped iron core 9 and goes through the two concave portions of the E-shaped iron core 9. In the invention, the number of turns N1 of the primary winding 5 is one, and the number of turns N2 of the secondary winding 6 is four as an example, although the number of turns N2 of the secondary winding 6 can be arbitrarily set depending on the ratio of the primary supply voltage to the required voltage for the secondary side. A power reception unit at the secondary side, which is constituted by the secondary winding 6 and the iron core 9, moves along the primary winding 5 and can receive electric power without contact, so that it can be used as a power supply for devices in an elevator car and a conveyer machine in a factory.

A detailed positional relationship between the primary winding 5, and the secondary winding 6 and the iron core 9 is shown in the cross-sectional view of FIG. 4. In FIG. 4, the primary winding 5 is located at the position P0 somewhat deeper from the middle of concave portion of the E-shaped iron core 9. Capacitance values of the serial capacitor $C_S$ and the parallel capacitor $C_P$ are determined at this position P0, and then, an experiment has been carried out in such arrangement of the primary winding 5, the secondary winding 6, and the iron core 9, to examine how the magnitude $|Z|$ and the phase $\theta$ of impedance of the inverter load 11 varies with the positional relationship between the primary winding 5, and the secondary winding 6 and the iron core 9

Figure 5:
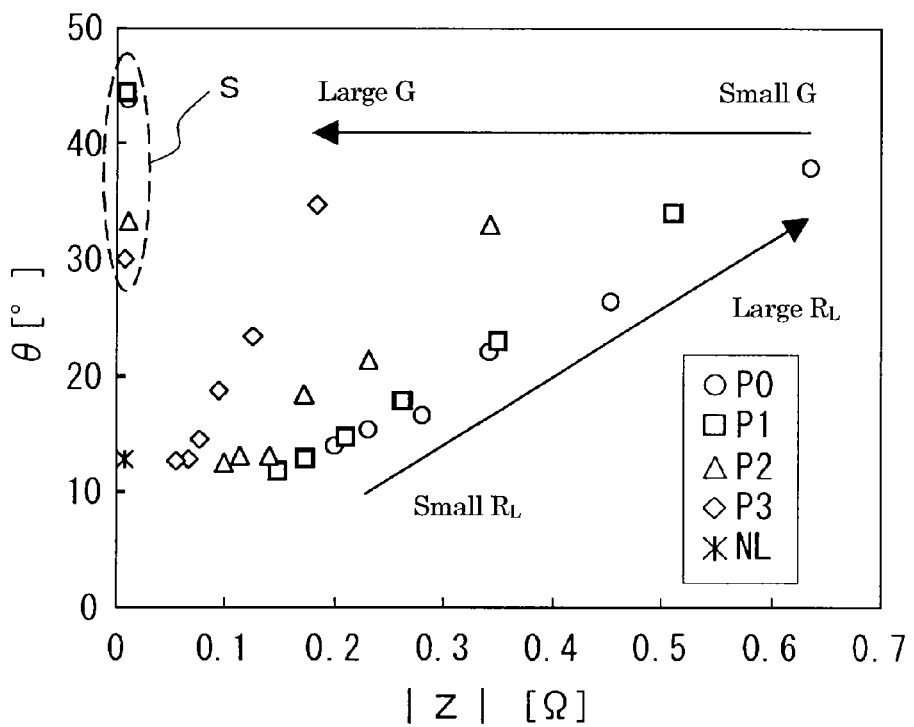
FIG. 5 is a graph showing a relationship between the magnitude and the phase of impedance of an inverter load when the spatial gap between a primary and a secondary windings and the magnitude of the load in Embodiment 1 of the invention are varied.

FIG. 5 is a graph showing a relationship between the magnitude $|Z|$ and the phase $\theta$ of impedance of the inverter load 11 when the spatial gap between the primary winding and the secondary winding, and the magnitude of the load are changed. Here, the spatial gap between the primary winding 5 and the secondary winding 6 are changed by moving the position of the primary winding 5 to positions P0, P1, P2, and P3 as shown in FIG. 4. In FIG. 5, "○" indicates the position P0; "□", the position P1; "Δ", the position P2; "◇", the position P3; and "*" indicates NL that represents the case of no load. The spatial gap between the primary winding 5 and the secondary winding 6 becomes larger as the position of the primary winding 5 moves from the position P0 to the position P3. The position P3 indicates the situation where the primary winding 5 is positioned outside the two concave portions of the E-shaped iron core 9. In addition, six resistors having the same specification are prepared as the load $R_L$, and the resistance value is changed by changing the number of resistors connected in parallel. By changing a combination of the position (P0 to P3) and the load $R_L$, the magnitude $|Z|$ and the phase θ of impedance of the inverter load 11 are obtained from the first order frequency-components of the drive voltage V and the drive current I as described above.

The experimental results are summarized in FIG. 5 as the relationship between the magnitude $|Z|$ and the phase θ of impedance of the inverter load 11. In addition, in the case where the primary winding 5 and the secondary winding 6 do not come into the position opposite to each other at all (in the case of no load NL), the magnitude $|Z|$ and the phase θ of impedance are represented by "*" (asterisk). From FIG. 5, connecting a set of points that are measured under the condition of the same position (the spatial gap between the primary winding 5 and the secondary winding 6 is the same) and different resistance values of the load $R_L$, a substantially straight line is obtained in a region where the load $R_L$ is relatively larger. In addition, the larger the spatial gap, the larger the gradient of the straight line becomes. Further, in a relatively small load $R_L$, region, the phase θ falls in the same constant value as that in the case of no load ("*" point), and the relatively smaller the load $R_L$, the smaller the magnitude $|Z|$ of the impedance becomes, and the magnitude $|Z|$ approaches the value at "*" point.

Meanwhile, the control circuit 4 has a storage unit in which the relationship among the magnitude $|Z|$ and the phase θ of impedance of the inverter load 11, and the spatial gap between the primary winding 5 and the secondary winding is mapped and stored. Thus, using the map stored in the storage unit, the control circuit 4 can detect how large the spatial gap is created between the primary winding 5 and the secondary winding 6. In addition, using the relationship among the magnitude $|Z|$ and the phase θ of impedance of the inverter load 11, and the spatial gap, it is possible to detect whether or not the primary winding 5 and the secondary winding 6 come into the position opposite to each other. Here, the distance of the spatial gap between the primary winding 5 and the secondary winding 6 can be represented by a coupling factor k for the equivalent circuit shown in FIG. 1. A larger spatial gap leads to a smaller coupling factor k, resulting in exhibiting such a characteristic as described above.

Figure 6:
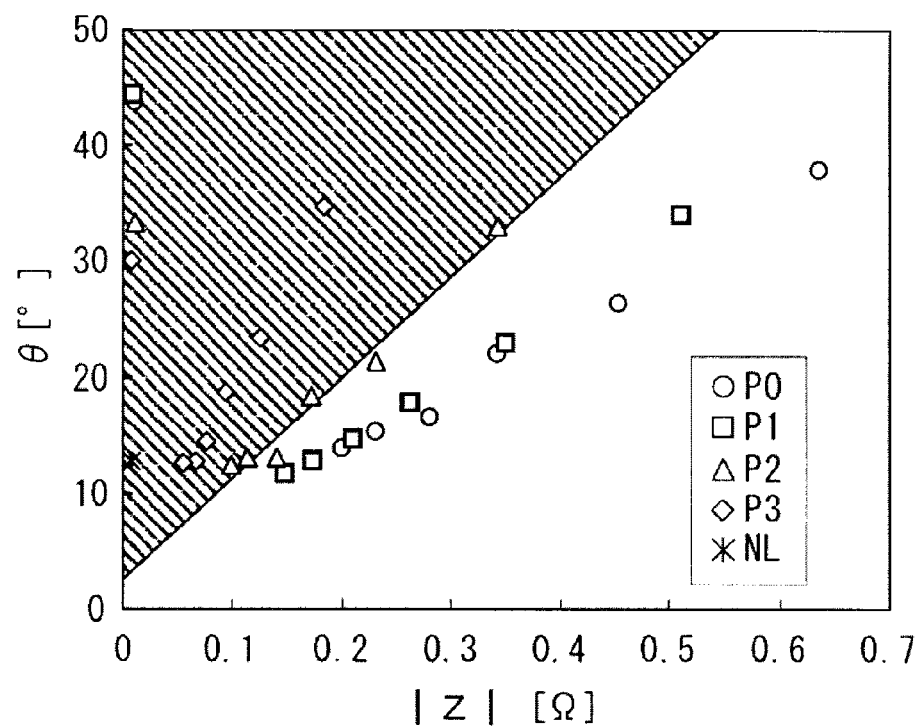
FIG. 6 shows a drive-prohibited region in the graph of FIG. 5 showing a relationship between the magnitude and the phase of impedance of the inverter load.

High-frequency power supply from the inverter circuit 3 may be stopped in a case of decrease in efficiency of power conversion in transmission and reception between the primary winding 5 and the secondary winding 6. Therefore, the shutoff of the high-frequency power supply (drive prohibition of the inverter circuit 3) can be determined using the graph shown in FIG. 5. FIG. 6 shows a drive-prohibited region marked by hatching in the graph of FIG. 5. The control circuit 4 according to the invention sets a combination of the magnitude $|Z|$ and the phase θ of impedance of the inverter load 11 that satisfies a condition where the spatial gap is larger than a predetermined value, as a combination in the drive-prohibited region. When a map is defined as a two dimensional space whose horizontal axis is the magnitude $|Z|$ of the impedance and vertical axis is the phase θ of the impedance, the region where the spatial gap is larger than the predetermined value (the region where the coupling factor k is smaller than a predetermined value) is the region above a positive slope straight line (θ=a×$|Z|$+b) having a gradient "a" and an intercept "b" in the two dimensional space (where, "a" is a positive value). The straight line (that is, the values "a" and "b") can be experimentally obtained from the measurement result described above, where $|Z|$ and θ are actually measured by changing the spatial gap.

For example, the region surrounded by a straight line connecting a series of points corresponding to the position P2 and the straight line at zero impedance magnitude $|Z|$, is set as the drive-prohibited region where the high-frequency power supply to the primary winding 5 is prohibited. In addition, the position P2 corresponds to the case where the primary winding 5 is located, as shown in FIG. 4, at the open side of the concave portions of the E-shaped iron core 9, i.e., it is located in the region where flux leakage from the iron core 9 is small. A combination of the magnitude $|Z|$ and the phase θ of the impedance in the drive-prohibited region can be stored as a map (or a table) in the storage unit.

In a case where a combination of the detected magnitude $|Z|$ and phase θ of impedance of the inverter load 11 is included in the drive-prohibited region set in advance in the map, the control circuit 4 determines that the primary winding 5 and the secondary winding 6 are not positioned sufficiently opposite each other, and controls the inverter circuit 3 so as to stop the high-frequency power supply to the primary winding 5. Note that the threshold for determining whether or not to supply the high-frequency power to the primary winding 5 is not limited to the spatial gap between the primary winding 5 at the position P2 and the secondary winding 6, but the spatial gap may be set slightly smaller or larger.

Furthermore, in the case of a short-circuit fault of the secondary circuit including the secondary winding 6 (a region S shown in FIG. 5), it is understood that the magnitude $|Z|$ of impedance of the inverter load 11 becomes extremely small. Therefore, when a map is defined on a two dimensional space whose horizontal axis represents the magnitude $|Z|$ of the impedance and whose vertical axis represents the phase θ of the impedance, the region for determining a short-circuit fault can be set as a rectangular region which is defined as $|Z|$<u and θ>v in the two dimensional space. Here, u is a first predetermined positive value and v is a second predetermined positive value, which can be experimentally determined. In the experiment described above, in the region to be determined as a short-circuit fault, the magnitude of the impedance is a little less than 2 times the magnitude of the impedance at no load ("*" in the figure), and the phase is larger than that at no load. Note that, when the magnitude of the impedance at no load is denoted as $|Z|^*$, and the phase at no load is denoted as θ*, the short-circuit fault region where a short-circuit fault occurs in the secondary circuit including the secondary winding, may be defined as a region of $|Z|<2\times|Z|^* \cap \theta>\theta^*$. Such a short-circuit fault region has been stored on a map stored in the storage unit of the control circuit 4.

Figure 7:
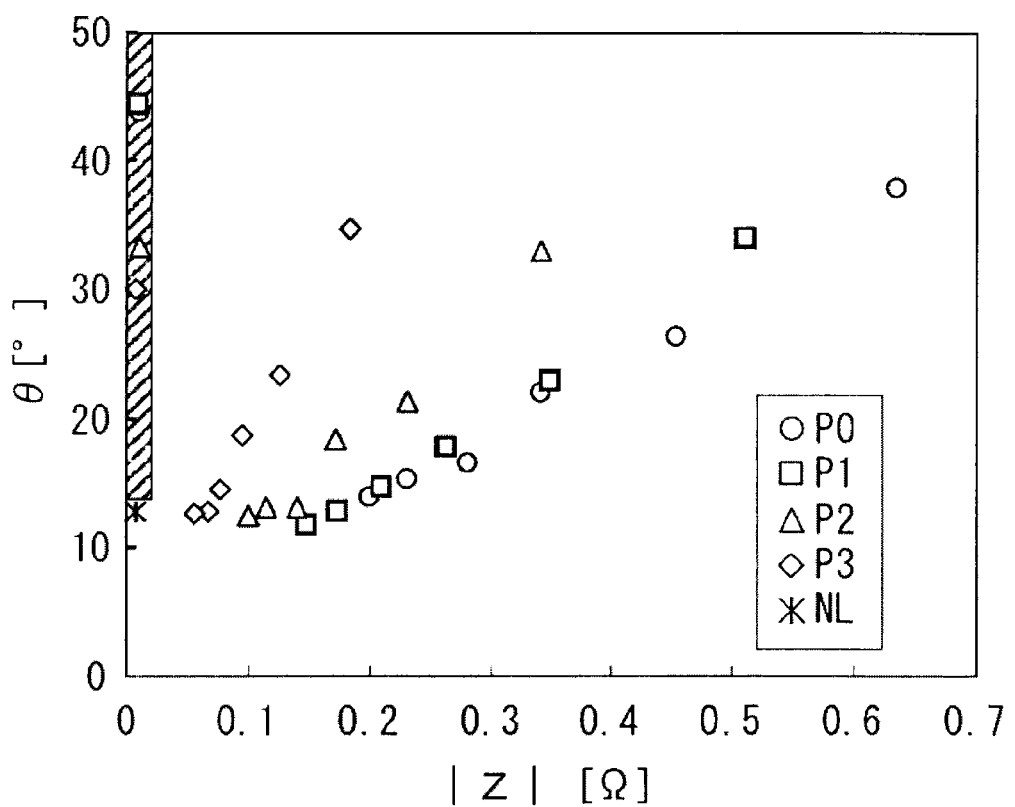
FIG. 7 shows a short-circuit fault region in the graph of FIG. 5 showing the relationship between the magnitude and the phase of impedance of the inverter load.

FIG. 7 shows the short-circuit fault region marked by hatching in the graph of FIG. 5. As shown in the hatched region of FIG. 7, the control circuit 4 according to the invention can determine that the secondary circuit including the secondary winding 6 is in a short-circuit fault in a case where a combination of the detected magnitude $|Z|$ and phase θ of impedance of the inverter load 11 falls in the short-circuit fault region. In addition, the control circuit 4 determines that a short-circuit fault occurs in the secondary circuit, and stops the high-frequency power supply to the primary winding 5, and then informs a user of the occurrence using the informing unit 13.

As described above, the control circuit 4 according to the present invention can detect how large the spatial gap is created between the primary winding 5 and the secondary winding 6 by having mapped and stored the relationship among the spatial gap and parameters of the measured magnitude |Z| and phase θ of impedance of the inverter load 11. In addition, using the relationship between the magnitude |Z| and phase θ of impedance of the inverter load 11 and the spatial gap, the control circuit can detect whether or not the primary winding 5 and the secondary winding 6 are positioned opposite each other. Further, the drive-prohibited region in which the high-frequency power supply to the primary winding 5 is prohibited, is set (stored) in advance, whereby the inverter circuit 3 can be controlled so as to supply the high-frequency power to the primary winding 5 only when these detected values does not fall in the drive-prohibited region. It should be noted that the drive-prohibited region can be set freely depending on product specifications.

Furthermore, the short-circuit fault region of which a short-circuit fault is to be informed from the informing unit 13 is set (stored) in advance as parameters of the detected magnitude |Z| and phase θ of the impedance of the inverter load 11, and the controller controls the inverter circuit 3 to stop the high-frequency power supply to the primary winding 5 only when these detected values are included in the short-circuit fault region, and can transfer occurrence of a short-circuit fault to the informing unit 13. It should be noted that the short-circuit fault region can be set freely depending on product specifications.

Note that, although the above description shows an example of applying the present invention to a contactless power supply system that is provided with a primary winding of one turn as shown in FIG. 3, the invention can also be applied to a contactless power supply system that uses coils having a plurality of turns as the primary winding and the secondary winding. As for a coil shape, for example, a so called "pancake coil" as disclosed in FIG. 14 of Japanese Unexamined Patent Publication No. 2010-172084, and a coil having a plurality of turns around a core as disclosed in FIG. 1 of the same Publication No. 2010-172084, can be used.

For example, using pancake coils of 30 cm in diameter for the primary winding and the secondary winding can transmit about 3 kW electric power with about a 20 cm spatial gap therebetween, thus applying to a battery charger such as for an electric vehicle. That is, installing a primary winding on the ground and mounting a secondary winding on the bottom of an electric vehicle can constitute a contactless power supply system that is capable of charging the vehicle simply by parking. In such a contactless power supply system, a detection method according to the invention can also be applied to a case where power supply needs to be stopped when the distance between the primary winding and the secondary winding becomes larger owing to a misalignment of the parking position of an electric vehicle, or when a short-circuit fault occurs in the secondary side.

When the number of turns of the primary winding is $n_1$ and the number of turns of the secondary winding is $n_2$, the secondary side impedance $Z_1$ observed from the primary side is generally represented by the equation (6).

$$Z_1 = Z_2 \times \left(\frac{n_1}{n_2}\right)^2 \quad (6)$$

That is, the impedance $Z_1$ observed from the primary side is detected as a value obtained by multiplying the secondary side impedance $Z_2$ by the inverse square of the turns ratio $(n_2/n_1)$ of the secondary side observed from the primary side. Since the characteristic shown in FIG. 5 to FIG. 7 is that in the case of $N_1=1$ and $N_2=4$, when the number of turns in the primary winding is changed to $n_1$ and the number of turns in the secondary winding is changed to $n_2$, the characteristic is expressed by multiplying the horizontal axis by approximately $(4/1)^2 \times (n_1/n_2)^2$.

The characteristics shown in FIG. 5 to FIG. 7 can actually be changed depending on the shape of a core and a way of winding a coil etc. other than the coil turns ratio. However, in each case, the equivalent circuit can be shown as FIG. 1, so that a region where the spatial gap is larger than a predetermined value (the coupling factor k is smaller than a predetermined value) is above a positive slope straight line ($\theta = a \times |Z| + b$), similar to that shown in FIG. 6. Once the shape of the coil part is fixed, specific values of the constants "a" and "b" can be determined by an experiment of measuring the magnitude |Z| and the phase θ of impedance by changing the spatial gap (or the coupling factor).

EXPLANATION OF REFERENCE CHARACTERS

1: contactless power supply device 2: direct current supply 3: inverter circuit 4: control circuit 5: primary winding 6: secondary winding 7: drive voltage detection unit 8: drive current detection unit 9: iron core 10: contactless power supply part 11: inverter load 12: primary component extraction unit 13: informing unit $C_S$: serial capacitor $C_P$: parallel capacitor $R_L$: load

The invention claimed is:

1. A contactless power supply device comprising:
an inverter circuit which outputs high-frequency power;
a control circuit which controls the inverter circuit;
a primary winding which is supplied with the high-frequency power from the inverter circuit, to transmit power through electromagnetic induction by resonating with a first capacitor;
a drive voltage detection unit which detects a drive voltage of the inverter circuit;
a drive current detection unit which detects a drive current of the inverter circuit; and
a primary component extraction unit which extracts, from the drive voltage and the drive current, a primary drive voltage and a primary drive current, that is, the first order frequency-components having the same frequency as a drive frequency of the inverter circuit,
wherein the primary winding transmits power to a secondary winding which comes into a position opposite to the primary winding through a spatial gap, and the control circuit calculates, on the basis of the primary drive voltage and the primary drive current, magnitude and phase of impedance of an inverter load, and
the control circuit detects how large the spatial gap is created between the primary winding and the secondary winding based on a stored relationship among the spatial gap and parameters of the measured magnitude and phase of impedance of the inverter load.

2. The contactless power supply device according to claim 1,
wherein the control circuit detects whether or not the primary winding and the secondary winding come into a position opposite to each other or detects the spatial gap between the primary winding and the secondary winding on the basis of the calculated magnitude and phase of impedance of the inverter load.

3. The contactless power supply device according to claim 2,
wherein the control circuit, when detecting the spatial gap between the primary winding and the secondary winding, determines, on the basis of the detection result, whether or not to supply the high-frequency power to the primary winding.

4. The contactless power supply device according to claim 2,
wherein the control circuit detects a short-circuit fault of a secondary circuit including the secondary winding on the basis of the calculated magnitude and phase of impedance of the inverter load.

5. The contactless power supply device according to claim 4,
wherein the control circuit includes a storage which stores as a map a relationship among the magnitude and the phase of impedance of the inverter load and the spatial gap between the primary and secondary windings and which stores in the map a combination of the magnitude and the phase of impedance of the inverter load that satisfies a condition where the spatial gap is larger than a predetermined value, as a combination in a drive-prohibited region; and stops the high-frequency power supply to the primary winding when a combination of the calculated magnitude and phase of impedance of the inverter load is in the drive-prohibited region on the map.

6. The contactless power supply device according to claim 5,
wherein the control circuit defines as the map a two dimensional space whose horizontal axis represents the magnitude of the impedance and whose vertical axis represents the phase, to set in the two dimensional space the drive-prohibited region above a straight line having a predetermined gradient.

7. The contactless power supply device according to claim 4,
wherein the control circuit includes a storage which stores as a map a relationship among the magnitude and the phase of impedance of the inverter load and the spatial gap between the primary and secondary windings and which stores in the map a combination of the magnitude and the phase of impedance of the inverter load when a short-circuit fault occurs in the secondary circuit, as a combination in a short-circuit fault region; and stops the high-frequency power supply to the primary winding when a combination of the calculated magnitude and phase of impedance of the inverter load is in the short-circuit fault region on the map.

8. The contactless power supply device according to claim 7,
wherein the control circuit defines as the map a two dimensional space whose horizontal axis represents the magnitude of the impedance and whose vertical axis represents the phase, to set as the short-circuit fault region in the two dimensional space a rectangular region where the magnitude of the impedance is smaller than a first predetermined positive value and the phase is larger than a second predetermined positive value.

9. The contactless power supply device according to claim 1,
wherein the primary component extraction unit extracts the primary drive voltage and the primary drive current from the drive voltage and the drive current in one cycle time interval of the drive frequency of the inverter circuit.

* * * * *